Oct. 10, 1961 R. GROTE ET AL 3,004,107

TELEPHONE PARTY LINE SWITCHING

Filed March 27, 1956 2 Sheets-Sheet 1

Inventors,
Richard Grote,
Eugen Jauch,
Herbert Töpfer, &
Walter Voithenleitner,
By. [signature] Attys.

Inventors,
Richard Grote,
Eugen Jauch,
Herbert Töpfer, &
Walter Voithenleitner,
By [signature] Atty.

United States Patent Office 3,004,107
Patented Oct. 10, 1961

3,004,107

TELEPHONE PARTY LINE SWITCHING

Richard Grote, Eugen Jauch, Herbert Topfer, and Walter Voithenleitner, Munich, Germany, assignors to Siemens & Halske Aktiengesellschaft, Berlin and Munich, Germany, a corporation of Germany Filed Mar. 27, 1956, Ser. No. 574,360
Claims priority, application Germany Mar. 31, 1955
19 Claims. (Cl. 179—18)

Figure 1:
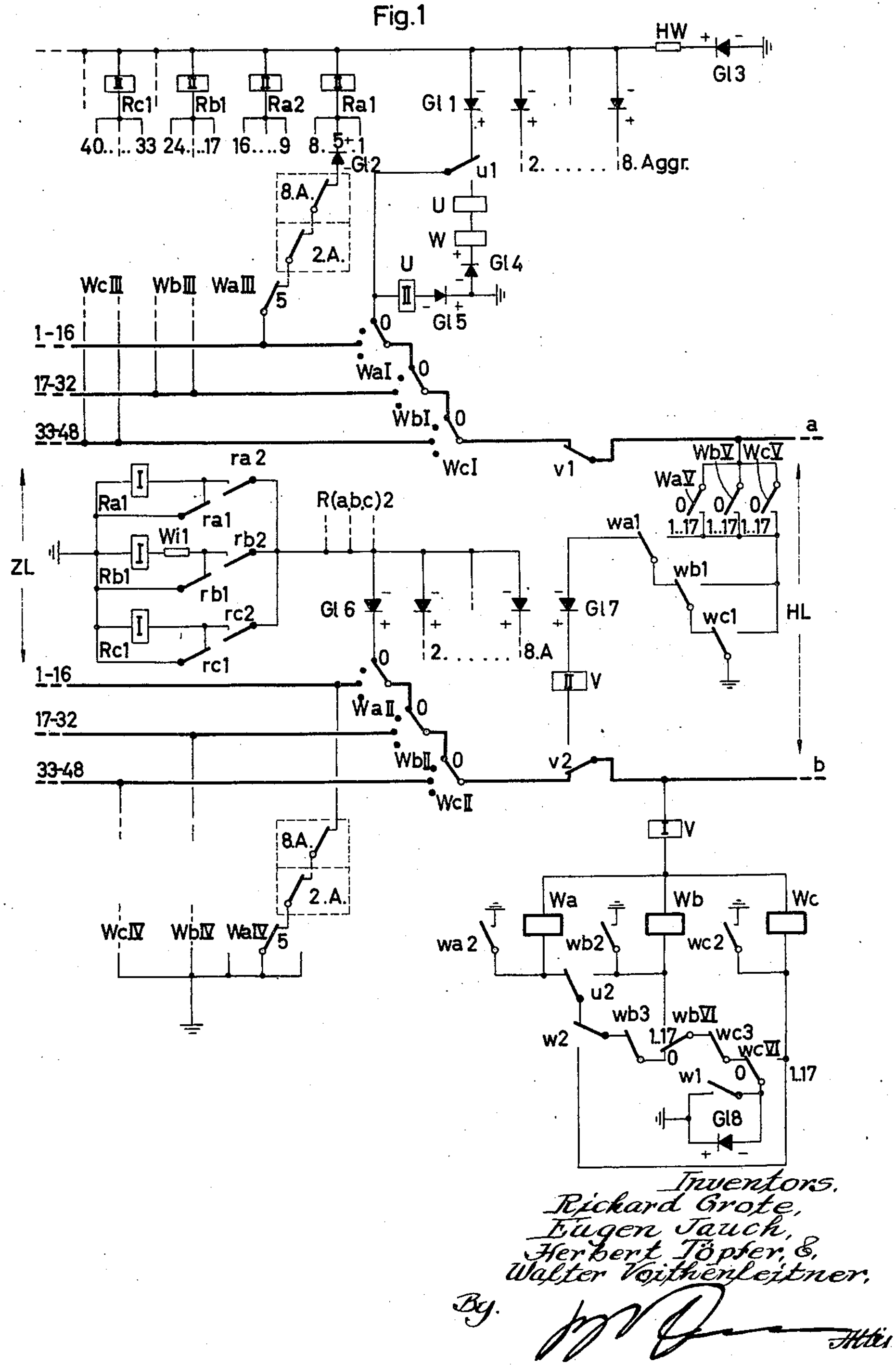

This invention relates to signalling systems and is particularly concerned with a switching arrangement for party lines in telephone systems.

Efforts to improve the efficiency of subscribers' lines in outlying areas of public exchange systems have led to combining the traffic, particularly on lengthy subscribers' lines which are little used, and conducting the traffic to the exchange over a comparatively smaller number of trunk lines. As a result, considerable savings and better utilization of the lines are obtained by connecting the subscriber lines in an unattended substation receiving battery feed from a main exchange, as distinguished from two and ten stations on one exchange line, without impairing the full utility and freedom in time of the individual subscriber stations.

A party line unattended substation comprises a star switch and transmission means disposed at the exchange. The star switch forms a switching point for subscriber branch lines coming together in the form of a star, and is connected with its exchange transmission means over a number of main lines which is less than that of the branch lines. In this technique, however, if the number of connected subscribers exceeds a certain limit, the dependable transmission of the starting or initiating criterion for the transmission means in the exchange becomes problematical since a common start conductor is provided for all subscribers served by the star switch. Accordingly, the start relays of the exchange transmission means are in known arrangements of this kind strongly preloaded by shunt current on the lines. The dependability in operation is particularly impaired by the fact that the shunt currents of the branch lines are all cumulative in the star switch of the substation. Accordingly, the resultant leakage resistance of a main line under the influence of atmospheric conditions—which may have a particularly disadvantageous effect on the insulation conditions in the case of long overhead lines—very easily assumes values which no longer satisfy the non-operate condition of the start relay in the exchange apparatus. The non-operate condition requires that the corresponding start relay remains at normal so long as the current fed thereto remains below a predetermined value. A start signal may in this way be unintentionally simulated resulting in an erroneous seizure of the start switch.

Since it is on the one hand desired to take into account in general the greater need for connections in the case of party lines, and since the problem in question furthermore appears in the same or similar form in a number of other telecommunication circuits (for instance for control, signal or supervisory purposes) it has been endeavored to eliminate as much as possible the detrimental action of the resultant leakage resistance in connection with a plurality of parallel connections on a common line provided for the remote control of switching devices.

A proposal for improving a current increase on a line conductor, which increase is to be evaluated as start criterion by an erroneously energized differential relay in the exchange apparatus, to the effect that a relatively low resistance relay in the common start line releases the start criterion by a short interruption of the closed-circuit current on a line conductor only upon direct grounding of a subscriber's loop, affords considerable assurance against the improper actuation of the start relay in the exchange apparatus due to a low leakage resistance of the branch lines. The usefulness of this solution is limited by the number of branch lines.

In another known switching arrangement, in order to prevent erroneous start signals by a total leakage resistance which is too low as a result of faulty insulation, subscribers' lines, common start line, and the switch means which are to be affected in the exchange apparatus are arranged so as to form a bridge circuit which is approximately balanced at the critical insulation value of the branch lines. The start criterion is brought about by unbalancing the bridge to cause operation of a relay disposed in the 0-leg thereof. This arrangement also puts a blocking cell in the start circuit of the branch line by a potential into blocked condition, which is derived from a conductor not used as start line. Since the start relay used in the 0-leg of such circuit must however be very sensitive due to the high internal resistance of the bridge circuit, the switching members provided in the indicated arrangement are subjected to a load which goes beyond the limits of their capacity. This excludes the possibility of dependable operation in practical use.

The invention proposes to take the start relay, which until now has been common to all subscribers of an unattended substation, out of the exchange apparatus, and to dispose it directly in the substation. By a subdivision of the lines, a number of individual subscriber groups are formed, and an individual start relay is provided for each of them. The subdivision of the lines depends thereby on the resultant leakage resistance of the branch lines so that their shunt currents cannot add to affect only one relay either in normal condition or during peak traffic. Therefore, small subscriber groups are to be formed and a corresponding number of start relays provided as made necessary by the condition of the system of lines, so as definitely to satisfy in each case the non-operate condition of the individual relays. Beyond this, no conditions are imposed on the grouping which may be effected in any desired and suitable manner or, in case of different individual values of the branch line leakage resistance, in accordance with leveling viewpoints. In the case of incompletely utilized star connections, the subscribers may be divided uniformly over the groups. By the splitting up of the branch lines and the formation of start groups in the substation star switch, it is possible on the other hand, to form the connection as a whole for a higher number of subscribers than appeared heretofore to be the maximum number feasible (48 connection units as compared with 30) without endangering the dependable transmission of the start criterion to the exchange apparatus. The upper limit thereby depends essentially on economic factors.

In accordance with a further feature of the invention, a start relay having two oppositely connected windings may be provided for two subscriber groups, each winding serving for one of the groups. This is of advantage particularly when only two groups need be formed. The energization of the relay is in such case avoided by shunt currents of both groups affecting the windings in a cancelling sense. On the other hand, of course, care must be taken in case of simultaneous calls from subscribers of both groups, that the difference in excitation of the oppositely connected windings is greater than, or at least equal to, the energy required for the operative energization of the start relay. In case of symmetrical windings, a resistance connected in series with one winding will reduce its energization current to the required value.

In the normal condition of the arrangement, each start relay has an energizing winding disposed in series with the branch line loops of its associated subscriber group. Upon initiation of an outgoing call, such relay is energized over one line conductor of the main lines of all substation transmission devices which are at the time idle.

In this condition, blocking cells connected in the start line effect decoupling of the main lines and prevent any possible disturbance on a line from affecting other undisturbed lines.

For the disconnection of the connecting means allotted to the subscriber groups in the substation and associated exchange apparatus, an evaluation circuit acting on the corresponding switches is started in outgoing calls from the substation by different marking of the individual group start relays, over the other line conductor of the main line of the seized exchange apparatus. In a starting chain of the substation, these main line conductors are in turn in case of disturbance blocked with respect to each other by blocking cells. The different marking is thereby effected by a second winding connected upon the operative energization of the corresponding group start relay in the starting circuit for the exchange apparatus or a contact of the relay itself. Since this second winding is connected in the identical or in opposite sense of the energization winding and has a given resistance, it produces for the start relay, the energizing winding of which has in the meantime become deenergized, either in the one group a counter-energization for the instantaneous release of the start relay or else a holding energization in each of the two other groups. Differentiation may again be effected with regard to these two conditions by means of the evaluation circuit in the exchange apparatus based upon the low or high ohmic winding resistance. The transmission of the marking signal, in the absence of the counterenergization may be effected by contact of the start relay which closes in this normal position thereof.

For the evaluation of the criteria transmitted over one conductor of the main line, there is provided in the exchange apparatus a relay circuit which for both directions of calls, within an interval determined by its elements, on the one hand orients the switches of the exchange apparatus as to groups, and on the other hand switches the corresponding parts in the substation directly over a line conductor of the main line. For this purpose there is used a defined train of pulses controlled by the evaluation circuit which train, being utilized in the substation by a relay circuit and blocking cells, disconnects the switch allotted to the particular subscriber group.

The ringing in incoming calls and the answering by the subscriber in case of outgoing calls may be effected directly over the branch line loop and one line conductor of the main line. Since the starting of the transmission from the substation takes place, however, over another line conductor, it is necessary to separate the setting operations of the switches in the substation and in the exchange apparatus which takes place over the same conductor. In accordance with a further feature of the invention, this is effected by a glow lamp or a blocking cell arranged in series with the actuating windings of the switches in the substation, which are branched off from the conductor. Such an arrangement in the selector branch releases the corresponding conductor of the main line advantageously for the transmission of another switching criterion; while the starting of the transmission takes place in the exchange with negative voltage corresponding to a lesser potential than ground, the switches in the substation are controlled with positive voltage corresponding to a higher potential than ground. In addition, when lines are connected through for communication, the blocking member becomes so highly resistant due to the negative battery voltage on the corresponding line conductor that the arrangement, loaded with the indicated connecting means on the line, may be considered electrically symmetrical without a corresponding balancing network for the other conductor.

Since a switch in the substation must sweep its wipers over the bank contacts of busy subscriber's lines, an auxiliary relay, the release of which is strongly delayed, had to be used up to now. Accordingly, the sweeping of the wipers over bank contacts of idle subscriber's lines required under the influence of this damping the same time interval and thus effected an unnecessary increase of the operating time of the switch.

In accordance with a further feature of the invention, the disturbing release time of this auxiliary relay is eliminated by holding it with negative voltage—with one winding in series with the actuating windings of the switch of the substation, now undamped—over another winding and a blocking cell only in connection with a subscriber's line characterized from the exchange apparatus as being busy over a line conductor of the main line. However, since the relay can now due to the elimination of the holding voltage instantaneously deenergize in the case of an idle subscriber's line, the stepping speed of the selector is considerably increased.

For incoming calls, the bank contacts of the connector stage which are associated with the subscribers of the substation, branching off from the test circuit, are distributed corresponding to the start grouping of the branch lines in the substation for the initiation of the hunting over a corresponding number of starting relays in the exchange apparatus. While the connector multiple and the scanner multiple of the transmission are in known manner uncoupled over resistances in order to prevent a double testing on both sides, the mutual uncoupling of the contacts of both multiples which are grouped on the individual starting relay, is in accordance with a further feature of the invention effected by means of an individual contact of the corresponding switch provided for each subscriber of the group. For this purpose, the normal contacts of the switches of each group which are actuated only in connection with the corresponding subscribers from all switch sets, are serially disposed in the circuit of the common starting relays. The different marking of the individual starting relays, for the disconnecting of the connecting means associated with their subscriber groups in the exchange apparatus and the substation, takes place in a manner similar to the criteria taken as basis for outgoing calls in the exchange apparatus, by reproducing the different holding and release conditions of the group start relays in the substation. This reproduction takes place depending on the start relays, in the form of different resistance values and contact functions by means of defined potentials for action on the evaluation circuit in the exchange apparatus, and introduces, in the identical sequence, the operations already described for outgoing calls.

In contradistinction to the sequence of seizure in outgoing calls in which first of all the first and thereupon the second and further repeater sets are taken into use, the incoming calls arrive in the opposite directon first toward the last repeater set, and then to the next to the last and following repeater sets connected in the chain. Assuming approximately the same load in both directions, this sequence provides for uniform wear.

The various objects and features of the invention will now be described with reference to the accompanying drawings showing essential parts of an embodiment in schematic circuit representation. Details not necessary for an understanding have been omitted; the contact positions of the switches or selectors and relays are shown in normal deenergized condition of the respective actuating windings.

Figure 2:
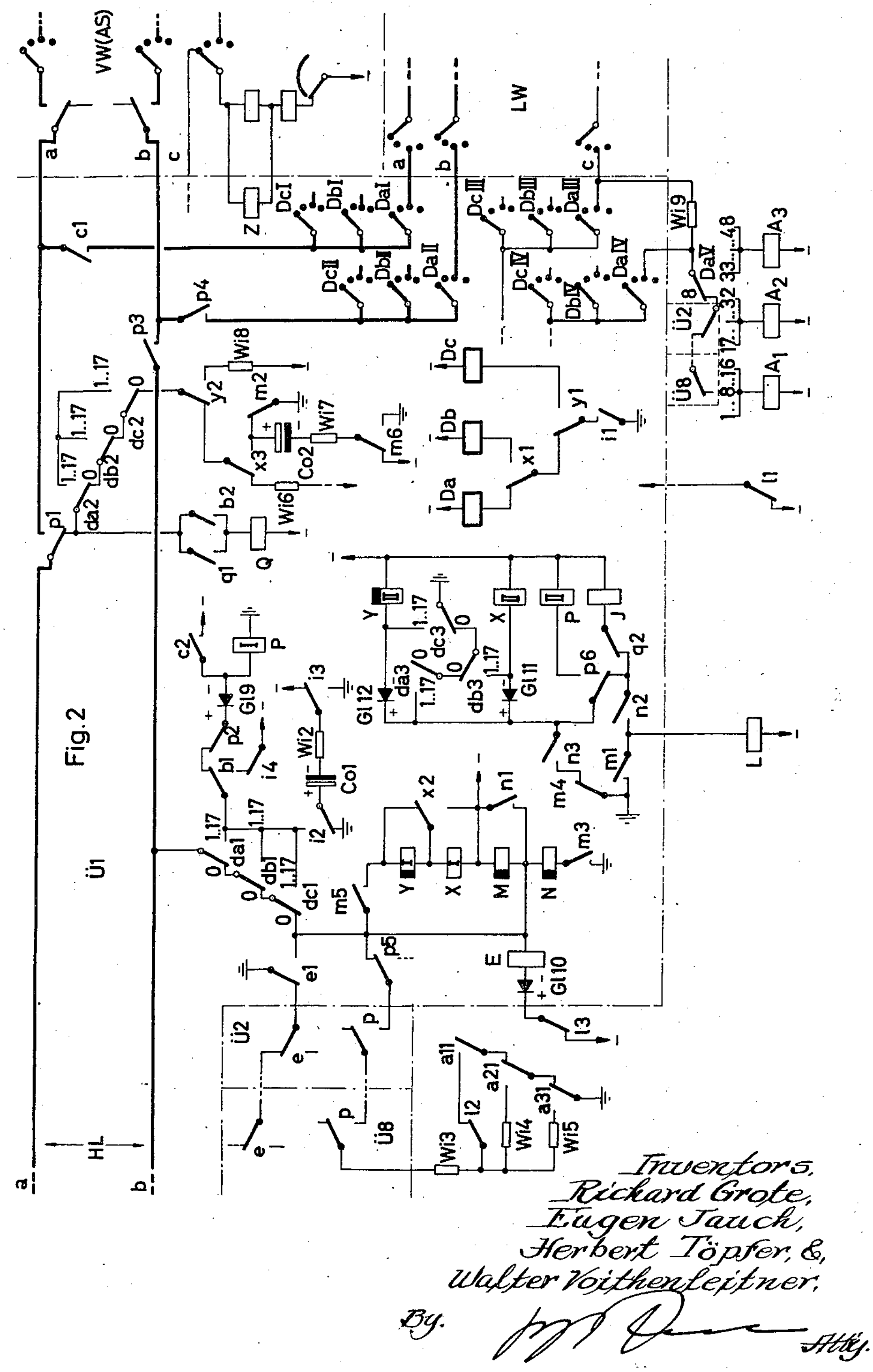

The substation shown in the embodiment comprises a switch set or star switch proper, shown in FIG. 1, and control means associated therewith and connected over a main line with exchange apparatus shown in part in FIG. 2.

The star switch set (FIG. 1) is the connecting point for 48 branch lines ZL extending from the subscriber stations in star form, these branch lines terminating in a multiple of eight units forming parts of the switch set. A corresponding number of eight main lines HL connects in the exchange with switch sets associated with each of said units. By a subdivision of the lines, there are formed in the present case three or even six individual groups of the same number of subscribers, and an individual start relay R is provided jointly for all units directly in the star switch set. Each group in its turn is provided with one selector W(*a*, *b*, *c*) for each unit, the purpose of which is to connect by its wipers W(*a*, *b*, *c*)I and W(*a*, *b*, *c*)II one of the subscriber branch lines connected to its contact bank with the corresponding main line HL both in outgoing and in incoming calls. The selector contacts W(*a*, *b*, *c*)III and W(*a*, *b*, *c*)IV effect uncoupling of the branch-line conductors grouped on the individual start relay from each other. In addition numerically similar subscriber contacts of the selectors of each group from all units, are connected serially in accordance with their sequence and combined, each by way of a blocking cell, on the start relay. The contact in question, of a seized unit, is actuated solely upon the selector step of the calling or called subscriber and separates the corresponding branch line loop from the line conductors of the starting chain. The blocking cell *Gl*2 connected in the circuit prevents upon answering of a called subscriber discharge phenomena in the ringer bridge of other stations of the same group. While the selector contacts *w*(*a*, *b*, *c*)1, as well as *w*(*a*, *b*, *c*)2 and *w*(*b*, *c*)3 in the units are actuated upon each step of the corresponding selector, the contacts W(*a*, *b*, *c*)V and W(*b*, *c*)VI shift from the 0-position into the position 1–17 after the first step of their selector. In this way, upon each setting step in the attracted state of the selector magnet, a ground impulse is given over the *a*-conductor of the main line HL, this impulse being evaluated in the exchange apparatus as verification indication.

The blocking cells *Gl*1 and *Gl*4 to 8 which are included in each unit of the star switch have the following functions: Over the blocking cells *Gl*1 and *Gl*6 1st to 8th unit, the *a*- and *b*-conductors of the main line HL coming together in the common starting chain are decoupled. If a "false ground" occurs on a conductor of any main line, for instance due to a line breakage, the element belonging to the line conductor passes, considered from said line, into the blocked condition thus assures the extension of calls over the still intact main lines. In the circuit for the disconnection of the selector members associated with the subscriber groups, two further blocking cells *Gl*4 and *Gl*5 regulate the effect of the different control pulses passing over the *a*-conductor of the main line, with respect to the attraction and holding windings of relays U and W provided for this purpose. The blocking cell *Gl*7 provides for actuation of the second winding of the auxiliary relay V so that such relay will hold itself in a given phase of establishing the connection via the *b*-conductor of the main line, with negative voltage, while the positive energization voltage for winding I of the said relay remains without influence on this holding winding II. A blocking cell *Cl*8 arranged in series with the actuating windings of the selectors lying branched off at the *b*-conductor makes it possible—aside from the starting with negative voltage of the exchange apparatus from the substation—to effect the setting operation, extending over the same main line conductor, of the switches in the substation from the exchange apparatus, with positive potential, without effecting a short circuit of the actuating windings. In normal condition, the interior of the substation may have its temperature controlled by means of a heating resistor HW disposed in idle main lines, in order to reduce the danger of corrosion caused by the formation of water of condensation should the temperature drop below the dew point. The blocking cell *Gl*3 connected in series with the heating resistor prevents the shunt formed by the heating circuit to produce a retarding action on the release of a starting relay. In connected condition, the heating of the unit in question is disconnected for reasons of symmetry.

The exchange apparatus (FIG. 2) is—in a manner similar to the substation—divided into eight individual sets, each connected over a main line HL with the units of the substation. In the case of outgoing calls, the transmission is effective to connect a seized main line extending from the substation, to the preselector stage VW coupled with its repeater (transmission) set, to block the calling subscriber in incoming calls, and to connect its meter Z. In incoming calls, the apparatus connects the corresponding connector outlet over the wipers D(*a*, *b*, *c*)I to IV with an idle main line extending to the substation and effects the setting of the latter on the desired subscriber line. For the marking of the individual subscriber, there is employed in each set of the exchange apparatus a selector device D(*a*, *b*, *c*), oriented group-wise which, acting in outgoing calls as follower and in incoming calls as scanner, carries out the same number of steps as the connecting means of a subscriber group in the corresponding unit of the substation. The setting operation is therefore synchronized and represents a hunting in both call directions. The disconnecting of the individual selector of a group including for the subscriber is effected in the transmission set (repeater set) occupied from one of the two call directions by an evaluation circuit comprising relays M, N, X and Y. In outgoing calls, the evaluation circuit is affected from the substation over the main line by a criterion given by the specific group start relays, and in incoming calls in the exchange apparatus by its balancing system which enters into action as a function of the group start relays $A_1$, $A_2$ and $A_3$ controlled by the connector, and itself prepares the selector associated with the group in question on the one hand in the set of the exchange apparatus and in the other direction in the set or unit of the substation connected by way of the main line.

The group relays $A_1$, $A_2$ and $A_3$ acted upon in groups corersponding to the division of the multiples in the substation over the same number of start relays by the test outlets of the connector multiple, are provided jointly for all sets for the starting of the transmission in incoming calls by means of the reproduction of the group criterion for the evalution circuit in the exchange apparatus. This is indicated in the circuit diagram by a dot-dash line separation of the switch members of the first repeater set U1. As in the substation, also in the common circuit part of the exchange apparatus, there takes place a series connection of numerically similar decoupling contacts D(*a*,*b*,*c*)V of the selectors of each group from all exchange or repeater sets. These contacts for simplification of representation are taken from the exchange sets U2 . . . 8 (not shown) and separately framed in the common circuit in the same manner as the *e*- and *p*-contacts in the starting circuit, from the chain circuit of which the oppositely directed utilization of the exchange sets by calls in both directions can be noted.

The manner of operation of switching elements up to now omitted and insofar as it does not appear selfevident, will be noted from the following description insofar as it relates to the scope of the invention. This description of the operation is broken down in general into outgoing calls, incoming calls and release. In the embodiment presently selected, the description of an internal possibility of connection of the subscribers of the substation with one another has been omitted.

A. *Outgoing calls*

If a subscriber of any group of the substation, for instance of the group formed for the subscribers 1 to 8, initiates an outgoing call by lifting his receiver, the call or seizure relay R*a*1 associated with this group of subscribers is energized by current from an idle exchange apparatus set:

—, *l*1 (FIG. 2—above right center), W*i*6, *x*3, *y*2, contact *dc*2, *db*2, *da*2 of selectors Da, D*b* and D*c* in 0-position, *p*1, *a*-conductor (main line), *v*1 (FIG. 1), wipers W*c*I, W*b*I, W*a*I of selectors W*a*, W*b* and W*c* in 0-position, *u*1, blocking cell G*l*1, starting chain, relay R*a*1/winding II, blocking cell G*l*2, subscriber contact W*a*III of selectors W*a* of the 8th to 1st unit in series, branch-line loop of the calling subscriber, subscriber contact W*a*IV of selectors W*a* of the 8th to 1st units in series, ground.

Since the blocking cells G*l*1 and G*l*2 in this circuit are arranged in pass direction while G*l*5 is in blocking direction, the relay R*a*1 is actuated and its contact R*a*2 starts the transmission in the exchange over the blocking cell G*l*6 inserted in the passage direction into the starting chain and the *b*-conductor of the main line:

—, *l*3 (FIG. 2—lower left hand), blocking cell G*l*10, relay E, contact *dc*1, *db*1, *da*1 of selectors Da, D*b* and D*c* in 0-position, *b*-conductor (main line), *v*2 (FIG. 1), wiper W*c*II, W*b*II, W*a*II of selectors W*a*, W*b* and W*c* in 0-position, blocking cell G*l*6, starting chain, *ra*2, relay R*a*1/winding I, ground.

The selector W*a* as well as the auxiliary relay V with its winding I in the substation set remain at normal due to the blocking cell G*l*8 inserted in blocking direction for this current branch on the main-line conductor. In the exchange apparatus the E-relay has responded; it now holds itself directly over its contact *e*1 over the path:

—, *l*3, blocking cell G*l*10, relay E, *e*1, ground. In connection with this holding circuit, relay M is also energized. Relay M over its contact *m*1 causes energization of a relay L which in turn and over its contact *l*1 takes the voltage from the *a*-conductor of the main line to the substation and thus from the winding II of the call relay R*a*1 while at its contact *l*3 it disconnects the E-relays of all exchange (repeater) sets. The operation of the blocking cells G*l*10 directed in opposition to each other at the collecting point of the exchange sets prevents the relays R*b*1 and R*c*1 in the substation set, which may have been connected through, from being definitely disconnected with their winding I and being unable to hold themselves with voltage over a second and following line connected at the collection point. The L-relay continues to hold itself for a short period of time over the contact bridge *n*2—*p*6—*n*3—*m*4 when the relay N also energized by the contact closure of *m*3 short-circuits the winding of the M relay and causes it to deenergize with delay. The contact *m*5 has however connected X-relay and in dependence on the latter, another relay Y to the *b*-conductor of the main line extending to the substation set, both of which cooperate in the exchange apparatus in the marking of the subscriber groups formed in the substation set. The relays M and N limit this operation as below described in paragraphs marked (*a*), (*b*), and (*c*) the M-relay determines the beginning while the N-relay at the end of the orientating time connects an impulse relay J in the exchange set, itself deenergizing upon the opening of the *m*3 contact. In the course of these switching operations, the blocking cells G*l*12 and G*l*13 prevent a premature energization of the holding windings II of the X and Y relays.

In the substation set, as has already been described for a calling subscriber of group 1 to 8, either the relays R*a*(1, 2), R*b*(1, 2) or R*c*(1, 2) deenergize, depending on the groups to which the subscriber belongs, distributed for instance over six relays. Since, in accordance with the circuit, every two seizure or start relays are combined in their effects on the evaluation in the exchange transmission, the following cases are to be considered:

(*a*) If the subscriber belongs to group 1 . . . 8 and correspondingly 9 . . . 16, the relay R*a*1 (or R*a*2 respectively) is energized in the starting circuit over its winding II.

However, upon actuation of its contact *ra*2 and disconnection of its winding I, it will immediately be released again in the following circuit by means of a counter-energization of its winding II:

—, relay X winding I, *x*2, *m*5, contact *dc*1, *db*1, *da*1 of selectors Da, D*b* and D*c* in 0-position, *b*-conductor (main line); *v*2, wiper W*c*II, W*b*II, W*a*II of selectors W*a*, W*b* and W*c* in 0-position, blocking cell G*l*6, *ra*2, relay R*a*1 winding I, ground.

Upon release of relay R*a*1, contact *ra*2 opens before the X-relay can energize. Accordingly, the selector Da in the exchange apparatus and the corresponding selector W*a* in the substation set will be effective in the further building up of the connection.

(*b*) If the subscriber however belongs to group 17 . . . 24 and correspondingly 25 . . . 32, the relay R*b*1 (or R*b*2 respectively) is energized in the starting circuit over its winding II. Over winding I of the X-relay, the same circuit is produced as described under (*a*). In this case, however, the ground potential remains on the *b*-conductor since the energization over the main line for the winding I of relay R*b*1 (or R*b*2) released by its own contact *rb*1 is a pronounced holding energization. This winding I is in this connection of such high resistance that relay X in the exchange circuit is energized by means of its winding I and its contact *x*2 releases the short circuit for the winding I of the Y relay, but the relay Y obtains insufficient current. In this way the "*b*"-group is marked in the exchange control circuit and the selector D*b* is made ready for the further course of the connection.

While for the disconnecting of the connecting means of group "*a*" in the exchange set and the substation set no special precautions had to be taken, in order to disconnect the selector W*b* allotted to the "*b*"-group in the star switch, a switching over in its direction must be given. This is done in the form of a positive impulse which, extended from the exchange set over the *a*-conductor of the main line, is utilized in the substation set by relay U. A charging effected by the contacts *m*2 and *m*6 with battery voltage and a discharging, prepared in the evaluating interval of capacitor C*o*2 passes over contact *x*3 of relay X which designates this group in the transmission with positive voltage to ground potential in the following manner to the winding II of the U relay in series with a blocking cell G/5 which permits this impulse to pass:

Ground, *m*6, W*i*7, —C*o*2+, *x*3, *y*2, contact *dc*2, *db*2, *da*2 of the selectors Da, D*b* and D*c* in 0-position, *p*1, *a*-conductor (main line), *v*1, wiper W*c*I, W*a*I of selectors W*a*, W*b* and W*c* in 0-position, relay U winding II, block-cell G*l*5, ground.

As a result of the brief discharge pulse, which can not pass to the starting chain over contact *u*1 due to the blocking cell G*l*1, the U relay is attracted, connects itself after cessation of the capacitor discharge over its own contact *u*1, a damping being imparted, and by means of contact *u*2 connects in the place of the selector W*a* in the branch on the *b*-conductor, the selector W*b* to the main line.

(*c*) If the subscriber finally belongs to group 33 . . . 40 and correspondingly 41 . . . 48, then, as described above under (*a*) and (*b*), there respond in the same circuit over the now low-ohmic holding winding of the seizure or start relay R*c*1 (or R*c*2) in the exchange set not only the X-relay by means of its winding I, but subsequently also the relay Y after release of its winding I by the contact *x*2 which on the other hand short circuits its own winding and causes the relay X to deenergize. In this way the "*c*"-group is marked in the exchange control circuit and the selector D*c* is connected for the further handling of the call.

For the disconnection of the corresponding member W*c* in the substation set, thereupon in the manner described under (*b*), due to a positive pulse given off by the attraction of the X relay, another negative pulse is given to the *a*-conductor of the main line as a function of the Y relay excited in the evaluation circuit. This subsequent pulse introduces a relay W in the shunting circuit of the substation set which has been prepared in accordance with (*b*):

—, W*i*3, *y*2, contact *dc*2, *db*2, *da*2 of selectors D*a*, D*b* and D*c* in 0-position, *p*1, a-conductor (main line), *v*1, wiper W*c*I, W*b*I, W*a*I of selectors W*a*, W*b* and W*c* in 0-position, *u*1, relay U winding I, relay W, blocking cell G*l*4, ground.

Relay U is accordingly released of the opposing winding I. The relay W holds itself in the circuit which in itself is damped until the function of the contact *w*2, which first of all connects the selector W*c* to the main line, is taken over after its initial step by the selector contact W*c*VI in position 1 . . . 17.

In accordance with these operations, therefore, due to the different marking of the start or seizure relays, the connecting members associated with the groups are disconnected synchronously that is, the selectors in the substation set and the exchange set are synchronized with each other. After the starting of the selectors D . . . , the relays X and Y respectively hold themselves in the exchange set while the relays E, M, L and N are disconnected. In the substation set, the function of the shunting contacts *u*2 and *w*2 after the starting of the selectors W . . . is interrupted by their own contacts W . . . VI, while the R . . . relay of the corresponding group is prepared with both windings again for supervision of connections and marking.

In the course of the operations already effected and as long as the relay N still holds itself over the contact *m*3 after the disconnecting of its winding, over the path: —, relay J, *q*2, *p*6, *n*3, *m*4, ground, the pulse relay J has energized and its contact *i*1 has connected the rotary magnet of the selector D*a* associated with the initially assumed subscriber group. At one of the other groups, this connection, depending upon the position of the *x*1 and the *y*1 contact will act on the selector D*b* or D*c* respectively. The selector operates; its contacts *da*1, *da*2 and *da*3 thus move from the 0-position into the position 1–17. At the same time a circuit becomes effective.

Ground, *i*3, W*i*2, —Co1+, *i*2, contact *da*1 of selector D*a* in position 1–17, *b*-conductor (main line), relay V winding I, rotary selector magnet W*a*, *u*2, *w*2, contact *wb*3 of selector W*b*, contact *wb*VI of selector W*b* in 0-position, contact *wc*3 of selector W*c*, contact W*c*VI of selector W*c* in 0-position, blocking cell G*l*8, ground, the capacitor Co1, connected before the shifting of the *i*-contacts on both sides to the exchange battery with positive voltage via ground potential, discharging to the winding I of the auxiliary relay V and the rotary magnet of the selector W*a* in the substation set associated with the subscriber group. In connection with one of the other groups, the discharge pulse would act on the selector W*b* or W*c* depending on the position of the *u*2 or *w*2 contacts respectively. Since the blocking cell G*l*8 is permeable for a more positive voltage, a flowing off of the discharge pulse over the starting chain is prevented by the blocking action of G*l*6 in the test circuit of the exchange control over contact *b*1 of an auxiliary pulse relay B (not shown) by the blocking cell G*l*9, the V-relay is energized simultaneously with the operation of selector W*a*, which steps its wipers one step out of the 0-position. The B-relay is to be energized in outgoing calls only when a subscriber line is busy. In the setting of the connecting means therefore, the selectors in the substation set and exchange operate synchronously.

(1) It is assumed that the first position of the selector W*a* is idle, that is, the subscriber connected to position 1 at the contact bank is not using the connecting devices and the selector in addition determines that the position is not that of the calling party, since a test circuit to be described later under (3) has not been established.

By energization of the pulse relay J, the rotary selector D*a* in the exchange set, as well as the rotary switch W*a* in the substation set have each been stepped ahead one step. In the meantime, by the shifting of the selector contact *da*2 from the 0-position into position 1–17, the start or seizure relay R*a*1 in the substation set has definitely deenergized and a verification relay Q in the exchange control has been connected by contact *b*2 of the B-relay (not shown) to the *a*-conductor of the main line extending to the substation set. The selector W*a* in operated condition can now transmit a verification pulse over the *a*-conductor of the main line to the exchange set by means of its contacts W*a*V and *wa*1 of which contacts W*a*V shifts after the first step from the 0-position into position 1–17 and contact *wa*1 shifts upon each step of the selector W*a*:

—, relay Q, *b*2, *p*1, *a*-conductor (main line), contact W*a*V of selector W*a* in position 1–17, contact *wa*1 of selector W*a*, contact *wb*1 of selector W*b*, contact *wc*1 of selector W*c*, ground.

When the contact *q*2 has disconnected relay J, there deenergize in the substation set the driving magnet of selector W*a* and the V-relay (ahead of the relay Q), the opened contacts *v*1 and *v*2 again connect the main line with the wipers W*a*I and W*a*II of selector W*a*. The verification relay Q in the exchange set is no longer able after the opening of the selector contact *wa*1 to hold itself, deenergizes with delay, and places its contacts into normal position. As a result, the circuit for the pulse relay which was interrupted by the contact *q*2 is again closed and the capacitor Co1 which has meantime been charged over the contacts *i*2 and *i*3 is again effective to act on the selector W*a* while the contact *i*1 again actuates the selector D*a* in the transmission. This operation continues until the wipers of the rotary selector W*a* in the substation set have reached the bank contacts of the calling subscriber.

(2) It is assumed that the second position of the selector W*a* is busy, that is, the subscriber connected to the corresponding main contacts is already communicating over another main line.

Over the contact *b*1 which in outgoing calls is switched over in connection with a busy subscriber's line, the auxiliary relay V in the substation set will hold itself, by means of its winding II after the deenergization of the J-relay, in the circuit:

—, *i*4, *b*1, contact *da*1 of selector D*a* in position 1–17, *b*-conductor (main line), *v*2, relay V winding II, blocking cell G*l*7, contact *wa*1 of selector W*a*, contact *wb*1 of selector W*b*, contact *wc*1 of selector W*c*, ground.

The wipers of the selector therefore sweep over the bank contacts of the busy line, the *a*- and *b*-conductors having been interrupted at the *v*-contacts.

(3) It is assumed that the third position of the selector W*a* is that of the calling subscriber and that such position is marked as "idle" at wiper D*a*III of selector D*a* in the exchange control by the absence of ground potential from the connector stage.

Since now the relay B (not shown in the drawing) deenergizes in the exchange set V-relay, with the *b*1 contact open, can no longer hold itself over its winding II in the substation set, and the main line is connected through to the subscriber over the contacts *v*1, *v*2 and the wipers W*a*I, W*a*II of the selector W*a*. The following test circuit is now produced.

—, relay Q, *q*1, *p*1, *a*-conductor (main line), *v*1, wiper W*c*I of selector W*c*, wiper W*b*I of selector W*b*, wiper W*a*I of selector W*a* (third position), branch line loop of the calling subscriber, wiper W*a*II of selector W*a* (third position), wiper W*b*II of selector W*b*, wiper W*c*II of selector W*c*, *v*2, *b*-conductor of the main line, contact *da*1 of the selector D*a* in position 1–17, *b*1, *p*2, blocking cell G*l*9, relay P winding I, ground.

The relay P is energized and holds itself over its own winding II:

—, relay P winding II, *p*6, contact *da*3 of selector D*a* in position 1–17, contact $db3$ of selector D$b$ in 0-position, contact $dc3$ of selector D$c$ in 0-position, ground.

The holding windings II of the X- and Y-relays, being arranged parallel to the series connection of the selector contacts $d$ . . . 3, cannot become energized due to the blocking cells G$l$11 and G$l$12 which are connected ahead thereof in blocking direction. However, if the disconnecting operation has been directed toward one of the two other groups, the blocking cells are in the pass direction. In such case, a holding circuit is effected for the winding II of the X- or Y-relay, respectively, over the corresponding selector contact $db3$ and $dc3$ respectively in position 1–17.

Relay J is disconnected by contact $p6$, stopping operation of the exchange control unit, the contact $p5$ taking over the blocking thereof for incoming calls. The contacts $p1$ and $p3$ connect the line conductors of the main line through to the preselection stage VW of the exchange system. The latter is operated, prepares the metering and connects to the first group selector which transmits to the subscriber of the substation set the dial tone, indicating that the numerical selection can be effected.

B. *Incoming calls*

An outlet of the connector stage LW of the exchange system is associated with each subscriber of the substation. The outlets of the multiple, branched off from the test circuit, are connected, in accordance with the grouping to 3 starting relays $A_1$, $A_2$ and $A_3$ in the exchange control circuit. In incoming calls, the connector engages the exchange control circuit and connects the relay corresponding to the group of the subscriber called, which relay continues to hold itself in the corresponding circuit. It shall be assumed that the called subscriber also belongs to the "$a$" group:

—, relay $A_1$, subscriber contact D$a$V of selector D$a$ of the 8th—1st exchange control set in series, W$i$9, bank control of the called subscriber connected in the connector-multiple to the $c$-conductor, . . . ground test potential in the connector.

The contact $a11$ thereupon causes operation, in reverse sequence to that described for outgoing calls, of the next idle exchange control or repeater set.

—, $l3$, blocking cell G$l$10, relay E, $p5$-contact chain . . . to 8th repeater set, W$i$3, $l2$, $a11$, $a21$, $a31$, ground.

In the holding circuit for the E-relay which is established over the contact $e1$, relay M is actuated which connects the L-relay over its contact $m1$. Its contact $l3$ disconnects the relay E while the contact $l2$ again disconnects the circuit mentioned so that the relays X and Y are not actuated over their windings I.

For the "$b$"-group, X relay winding I would operate over contact $a21$ of relay $A_2$ and the high ohmic resistance $wi4$, and for the "$c$" group relay Y, winding I over the contact $a31$ of relay $A_3$ and the low resistance W$i$5, freed by the X-relay, also the relay. Thus the contact $l2$ accordingly provides the release energization of the start or seizure relay R$a$1 (or R$a$2), the high ohmic resistance W$i$4 providing the holding energization of the seizure relay R$b$1 (or R$b$2) and the low ohmic resistance W$i$5 providing the holding energization of the start or seizure relay R$c$1 (or R$c$2). The resistance W$i$3 acting in each of these circuits provides for balancing of the main line HL.

The further building up of the connection takes place, in the same manner as already described in connection with outgoing calls, with the difference that the B-relay (not shown) in the case of incoming calls holds itself upon each step of the selectors D$a$, D$b$ or D$c$ for the time of attraction of the pulse relay J. Accordingly, the auxiliary relay V can hold itself continuously in the substation set with its winding II so that the wipers of a selector W$a$, W$b$ or W$c$ move over all subscriber bank contacts regardless of whether the subscriber is free, busy or is engaged in an outgoing call. In the control circuit, the setting operation of the selector D$a$ is interrupted by relay C (not shown) when the wipers of the selector in the known scanning operation have reached the $c$-conductor of the connector which is provided with test potential for the called party and, by the placing of potential on wiper D$a$IV of selector D$a$, prevent testing on an already existing call. Contact $c1$ connects the winding I of the P-relay which, cooperating with contact $p6$ over the J-relay stops the selector and holds itself by means of its holding winding II. Contact $p5$ moves the starting chain in incoming calls further to the next control or repeater exchange set and contacts $p1$, $p3$, $p4$ and $c1$ connect the line conductors over the main line to the substation set. At the substation set, the line conductors are connected with the station of the called subscriber by way of the branch line ZL by the wipers W$a$I and W$a$II of the selector W$a$ which are set synchronously with the selector D$a$ in the exchange control. The selector contact D$a$V of the selector D$a$ has opened on the position of the called party and disconnected the starting relay $A_1$. During the deenergization time of the relay, the exchange control circuit transmits the first ring to the subscriber. The further ringing is effected from the connector. When the subscriber answers, the battery feed relay in the connector is actuated and disconnects the ringing current in known manner.

C. *Release*

When upon conclusion of a call the subscriber hangs up, the meter pulses pass in known manner from the group selector stage to the Z-relay in the preselector. This relay controls the individual meter of the subscriber. When the metering is completed, the release takes place in the group selector, the preselector is released and as a function of its 0-position releases the test relay P in the exchange set control by opposing energization of a third winding which has not been shown in the circuit. In this way the P-relay also releases, closes the circuit for the pulse relay J, and the rotary switch W$a$ in the exchange set is actuated in the manner described due to the interplay between the relays J and Q. In position 17 the selector is to be disconnected. After release of the Q relay, the pulse relay J connects the selector W$a$ in the substation set and causes further stepping its wipers. In position 17 of the selector W$a$, the selector contact $wa1$ closes upon the actuation of the rotary magnet, but the selector contact W$a$V after a short time by switching from the position 1–17 into the 0-position again opens the verification circuit so that hte damped Q-relay does not energize during this interval, and accordingly the relay J cannot deenergize. Only by a further switching operation does the J-relay become deenergized and during its release time, the rotary magnet of selector D$a$ receives a stpping pulse for stepping its wipers from position 17 into the 0-position. The release is thus terminated.

The above explanations with regard to the release operations are intended merely for the sake of completeness, further details which are without importance for an understanding of the invention have been omitted. For the same reason the description of details concerning interconnection between subscribers connected to the substation, as well as the interception and the busy trunk marking have been omitted.

Of course, smaller connection units of circuits may also be provided in accordance with the invention. Based upon the detailed description of the 8/48-connection type, it need only be mentioned, for example, as compared with the formation of a 3/16-connection type, that—aside in each case from five units of the substation set, its main trunk lines, the exchange control and thirty-six blocking cells—the selectors W$b$, W$c$, D$b$ and D$c$, the relays R$a$1, 2 winding I as well as R$b$1, R$b$2, R$c$1, R$c$2 winding I and II, U, W, X, Y, $A_2$ and $A_3$ in the remaining three units are completely eliminated. The essential features for the operation of such a simplified switching arrangment can be derived from the foregoing explanations. Thus, in accordance with the invention, assuming that a substation set is composed of selectors and the customary structural elements, there will result a minimum expenditure as compared with all previously known arrangements, in addition to which load is removed from the main line, and accordingly the reliability of operation is greatly increased.

The invention is by no means limited solely to the specifically exemplified use in telephone systems with party-line connections and the substation set taken as basis in the embodiment given by way of example. Rather it may be used with the same advantage for all variants of telephone technique, whether it be for the purpose of control, regulation, signaling or supervision over large distances in connection with which as a result of the grouping of any desired line bundle to switch means at any connecting point, the resultant leakage resistance is to be maintained without influence on the common transmission line for the elements at the end of the line which are to be controlled or evaluated.

Changes may be made within the scope and spirit of the appended claims which define what is believed to be new and desired to have protected by Letters Patents.

We claim:

1. A telephone system comprising subscriber lines subdivided in a plurality of subscriber groups, each group having branch line conductors extending from the subscriber lines belonging thereto, a switching device, said branch line conductors connecting the respective subscriber lines to said switching device, switching means in said switching device for extending outgoing calls from said lines and incoming calls to said lines, respectively, and a plurality of start relays in said switching device, each start relay being respectively cooperatively associated with all branch line conductors of one of said groups over contacts in said switching device and being effective to start operation of said switching means to initiate extension of calls.

2. A system and cooperation of parts according to claim 1, wherein each of said start relays has two oppositely connected windings, each winding being respectively cooperatively associated with all branch line conductors of one of said groups over contacts in said switching device.

3. A system and cooperation of parts according to claim 1, wherein each of said start relays has a winding normally disposed in the line loop circuits of the branch lines of the respectively associated subscriber group, a control circuit, a main line extending from said switching device and terminating in said control circuit, and means in said control circuit effective incident to an outgoing call for energizing said start relay over a conductor of said main line.

4. A system and cooperation of parts according to claim 1, wherein each start relay has two oppositely connected windings, each winding being respectively cooperatively associated with all branch line conductors of one of said groups over contacts in said switching device, the operative actuation of each start relay depending upon the difference between the energy required for the energization of said oppositely connected windings.

5. A system and cooperation of parts according to claim 1, wherein each start relay has a winding normally disposed in the line loop circuits of the branch lines of the respectively associated subscriber group, a control circuit, a main line extending from said switching device and terminating in said control circuit, means in said control circuit effective incident to an outgoing call for energizing the corresponding start relay over a conductor of said main line, switches in said control circuit respectively associated with said subscriber groups, an evaluating circuit in said control circuit, and means in said switching device controlled by different potential criteria respectively determined by the respective start relays for starting the operation of said evaluating circuit over another conductor of said main line to cause operative actuation of one of said respectively associated switches.

6. A system and cooperation of parts according to claim 5, comprising a plurality of main lines, start chain means for the line conductors of all main lines, and blocking cell means in said chain means.

7. A system and cooperation of parts according to claim 5, comprising control means for governing the energization of the respective start relays, said control means comprising circuit means including a resistance for connecting current to a start relay involved in a call, said resistance determining the potential criterion for effecting energization of the corresponding start relay.

8. A system and cooperation of parts according to claim 5, wherein said different potential criteria are controlled by contact means governed by the respective start relays.

9. A system and cooperation of parts according to claim 5, comprising a relay chain for controlling said evaluating circuit.

10. A system and cooperation of parts according to claim 5, comprising means controlled by said evaluation circuit responsive to transmission of a potential criterion corresponding to a start relay for controlling over one of the conductors of said main line a relay circuit in said switching device to disconnect the switch allotted to the corresponding subscriber group.

11. A system and cooperation of parts according to claim 10, comprising a relay circuit forming part of said switching device, and means controlled by said evaluation means for transmitting impulses over one of the line conductors of said main line for controlling said relay circuit.

12. A system and cooperation of parts according to claim 10, comprising switches in said control circuit, means for synchronizing the setting of said switches in said switching device and in said control circuit, respectively, over one conductor of said main line, a branch circuit extending from said one conductor in said switching device and containing the operating windings for the switches corresponding thereto, and means for disconnecting the start criterion transmitted over said one conductor to maintain symmetry for talking condition over said main line.

13. A system and cooperation of parts according to claim 12, comprising an auxiliary relay having a first winding connected in series with said operating windings, a second winding for said auxilary relay connected in series with a blocking cell, and means governed by said control circuit over one conductor of said main line for holding said auxiliary relay over said second winding responsive to ascertaining busy condition of a subscriber's line.

14. A system and cooperation of parts according to claim 1, comprising connector means, outlets of the multiple of said connector means which are allotted to subscriber lines being branched off from the testing circuit in said control circuit and distributed to individual group start relays disposed in said control circuit in accordance with the start grouping of branch lines in said switching device.

15. A system and cooperation of parts according to claim 14, comprising means controlled by a contact of the corresponding connector for decoupling the outlets of said multiple which are grouped relative to one start relay with respect to each subscriber included in the group served thereby.

16. A system and cooperation of parts according to claim 15, comprising a plurality of control circuits, means for connecting in series with said group start relay contacts of the switches of all control circuits which are to be actuated in connecting with the bank contacts of a given subscriber.

17. A system and cooperation of parts according to claim 14, comprising means in said control circuit effective incident to incoming calls for providing a criterion for outgoing calls for the purpose of disconnecting the groups distributed to a plurality of start relays.

18. A system and cooperation of parts according to claim 17, wherein said criterion is provided in the form of different resistance values and contact functions producing defined potentials for controlling said evaluation circuit and thereafter directly the connecting means in said control circuit and said switching device which are allotted to the respective subscriber groups.

19. A system and cooperation of parts according to claim 16, comprising chain means for said control circuits, the seizure of said control circuits being effected in outgoing calls in opposite sense to seizure thereof in incoming calls.

References Cited in the file of this patent

UNITED STATES PATENTS

| | | |
|---|---|---|
| 2,193,427 | Marrison | Mar. 12, 1940 |
| 2,244,911 | Jauch | June 10, 1941 |
| 2,402,446 | Powell | June 18, 1946 |
| 2,422,565 | Powell | June 17, 1947 |
| 2,532,097 | Hersey | Nov. 28, 1950 |
| 2,542,079 | Grundin et al. | Feb. 20, 1951 |
| 2,844,654 | Hemel | July 22, 1958 |